(12) United States Patent
Liao

(10) Patent No.: US 11,870,742 B2
(45) Date of Patent: Jan. 9, 2024

(54) INFORMATION EXCHANGE METHOD AND APPARATUS, DEVICE, AND MEDIUM

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 0 days.

(21) Appl. No.: 17/818,621

(22) Filed: Aug. 9, 2022

(65) Prior Publication Data

US 2022/0385600 A1    Dec. 1, 2022

Related U.S. Application Data

(63) Continuation of application No. PCT/CN2021/087336, filed on Apr. 15, 2021.

(30) Foreign Application Priority Data

Apr. 30, 2020   (CN) .......................... 202010366955.4

(51) Int. Cl.
    *G06F 15/16*   (2006.01)
    *H04L 51/04*   (2022.01)
    *H04L 51/42*   (2022.01)

(52) U.S. Cl.
    CPC .............. *H04L 51/04* (2013.01); *H04L 51/42* (2022.05)

(58) Field of Classification Search
    CPC .............................. H04L 51/04; H04L 51/42

USPC ......................................................... 709/206
See application file for complete search history.

(56) References Cited

U.S. PATENT DOCUMENTS

| 9,122,758 | B1 * | 9/2015 | Blower | G06F 16/9535 |
| 10,382,379 | B1 * | 8/2019 | Zhang | G06Q 10/107 |
| 10,467,593 | B2 * | 11/2019 | White | G06Q 10/10 |
| 11,443,348 | B1 * | 9/2022 | Bragdon | H04L 51/18 |
| 11,537,564 | B2 * | 12/2022 | Watanabe | H04L 67/02 |

(Continued)

FOREIGN PATENT DOCUMENTS

| CN | 104219214 A | 12/2014 |
| CN | 105843463 A | 8/2016 |

(Continued)

OTHER PUBLICATIONS

Search Report and Written Opinion dated Jun. 28, 2021 in PCT/CN2021/087336, English Translation of Search Report only (11 pages).

(Continued)

*Primary Examiner* — Anthony Mejia

(57) ABSTRACT

An information exchange method and apparatus, a device, and a medium are provided. Said method comprises: receiving, from a sharing party, a sharing request for sharing a target mail; and creating, in response to the sharing request, an instant messaging IM group comprising the sharing party and a shared party at an IM end, displaying a discussion interface corresponding to the IM group at a mail end, and sharing the target mail with the shared party, to enable information exchange between the sharing party and the shared party in the IM group and/or in the discussion interface based on the target mail.

25 Claims, 6 Drawing Sheets

(56) References Cited

U.S. PATENT DOCUMENTS

| | | | |
|---|---|---|---|
| 2005/0160145 A1* | 7/2005 | Gruen | G06Q 10/107 709/206 |
| 2006/0095514 A1 | 5/2006 | Wang et al. | |
| 2009/0064284 A1 | 3/2009 | Poston et al. | |
| 2009/0313554 A1* | 12/2009 | Haynes | G06Q 10/107 715/752 |
| 2012/0151377 A1* | 6/2012 | Schultz | G06Q 10/103 715/751 |
| 2012/0179755 A1 | 7/2012 | Fishkin et al. | |
| 2014/0310345 A1* | 10/2014 | Megiddo | G06Q 10/101 709/204 |
| 2015/0052032 A1* | 2/2015 | Aharoni | H04L 51/42 705/30 |
| 2015/0156153 A1* | 6/2015 | Deselaers | H04L 51/42 709/206 |
| 2015/0277725 A1* | 10/2015 | Masterson | G06F 3/04842 715/753 |
| 2015/0278750 A1* | 10/2015 | Bhagat | G06Q 10/063114 705/7.15 |
| 2015/0341401 A1* | 11/2015 | Lee | G06Q 10/101 715/753 |
| 2018/0124155 A1* | 5/2018 | Ryzhkov | G06Q 10/10 |
| 2018/0367484 A1* | 12/2018 | Rodriguez | H04L 67/75 |
| 2019/0042059 A1* | 2/2019 | Baer | G06F 3/0481 |
| 2019/0050393 A1* | 2/2019 | Henderson | H04L 12/185 |
| 2019/0065450 A1 | 2/2019 | Bhogal et al. | |
| 2019/0340832 A1* | 11/2019 | Srinivasan | G06T 19/20 |
| 2020/0026783 A1* | 1/2020 | Watanabe | G06F 16/176 |
| 2020/0274916 A1* | 8/2020 | Choi | H04L 67/06 |
| 2020/0412679 A1* | 12/2020 | Han | H04L 51/42 |
| 2021/0067475 A1 | 3/2021 | Chen et al. | |
| 2021/0067570 A1 | 3/2021 | Chen et al. | |
| 2021/0105235 A1* | 4/2021 | Peuc | G06F 3/0486 |
| 2022/0050578 A1* | 2/2022 | Waldman | G06F 3/0481 |
| 2022/0343281 A1* | 10/2022 | Gurumoorthy | H04L 12/18 |
| 2022/0368656 A1* | 11/2022 | Liao | H04L 51/046 |
| 2022/0377030 A1* | 11/2022 | Liao | H04L 51/224 |

FOREIGN PATENT DOCUMENTS

| | | | | |
|---|---|---|---|---|
| CN | 105897553 A | | 8/2016 | |
| CN | 106533924 A | | 3/2017 | |
| CN | 106789574 A | | 5/2017 | |
| CN | 108055196 A | | 5/2018 | |
| CN | 108055197 A | | 5/2018 | |
| CN | 108156070 A | | 6/2018 | |
| CN | 108306810 A | | 7/2018 | |
| CN | 108322384 A | | 7/2018 | |
| CN | 108494572 A | | 9/2018 | |
| CN | 108924038 A | | 11/2018 | |
| CN | 110661698 A | | 1/2020 | |
| CN | 110709869 A | | 1/2020 | |
| CN | 111581924 A | | 8/2020 | |
| EP | 3094068 A1 | * | 11/2016 | G06Q 10/107 |
| WO | WO-2016189350 A1 | * | 12/2016 | H04L 51/04 |
| WO | WO-2020263612 A1 | * | 12/2020 | G06F 3/0482 |

OTHER PUBLICATIONS

Chinese Office Action in CN202010366955.4, English Translation (18 pages).

Extended European Search Report dated Aug. 7, 2023 in European Application No. 21795955.0 (9 pages).

* cited by examiner

INFORMATION EXCHANGE METHOD AND APPARATUS, DEVICE, AND MEDIUM

This application is a continuation application of International Application No. PCT/CN2021/087336, filed on Apr. 15, 2021, which claims the priority to Chinese Patent Application No. 202010366955.4 titled "INFORMATION EXCHANGE METHOD AND APPARATUS, DEVICE, AND MEDIUM", filed on Apr. 30, 2020 with the China National Intellectual Property Administration (CNIPA), both of which are incorporated herein by reference in entireties.

FIELD

The present disclosure relates to computer technology, and in particular, to a method and an apparatus for exchanging information, a device and a medium.

BACKGROUND

With the development of computer technology, email becomes an essential tool for communication in industries. How to improve the communication efficiency with regard to a mail that requires multi-party collaboration communication is an urgent problem to be solved in a process of improving work efficiency.

According to the conventional technology, in a case that a sharer needs to perform multi-party communication with regard to a mail, the sharer normally forwards the mail to each shared party, and then communicates with each shared party one by one or holds an offline face-to-face meeting for discussion, resulting in inefficient communication.

SUMMARY

A method and an apparatus for exchanging information, a device and a medium are provided according to embodiments of the present disclosure, to improve efficiency of the efficiency of information exchange in multi-party collaboration communication.

A method for exchanging information is provided according to a first aspect of the present disclosure. The method includes:
 receiving a sharing request for sharing a target mail from a sharing party; and
 creating, in response to the sharing request, an instant messaging (IM) group including the sharing party and a shared party at an IM end, displaying a discussion interface corresponding to the IM group at a mail end, and sharing the target mail with the shared party, to enable information exchange between the sharing party and the shared party in the IM group and/or in the discussion interface based on the target mail.

An apparatus for exchanging information is further provided according to a second aspect of the present disclosure. The apparatus includes:
 a module for receiving a request, configured to receive a sharing request for sharing a target mail from a sharing party; and
 a module for creating a group, configured to create, in response to the sharing request, an IM group including the sharing party and a shared party at an IM end, display a discussion interface corresponding to the IM group at a mail end, and share the target mail with the shared party, to enable information exchange between the sharing party and the shared party in the IM group and/or in the discussion interface based on the target mail.

An electronic device is provided according to a third aspect of the present disclosure. The electronic device includes:
 one or more processors; and
 a memory for storing one or more programs, where the one or more processors, when executing the one or more programs, perform the method for exchanging information according to any one of the embodiments.

A computer readable storage medium is further provided according to a fourth aspect of the present disclosure. The computer readable storage medium stores a computer program. The computer program, when being executed by a processor, performs the method for exchanging information according to any one of the embodiments.

DETAILED DESCRIPTION

Figure 1A:
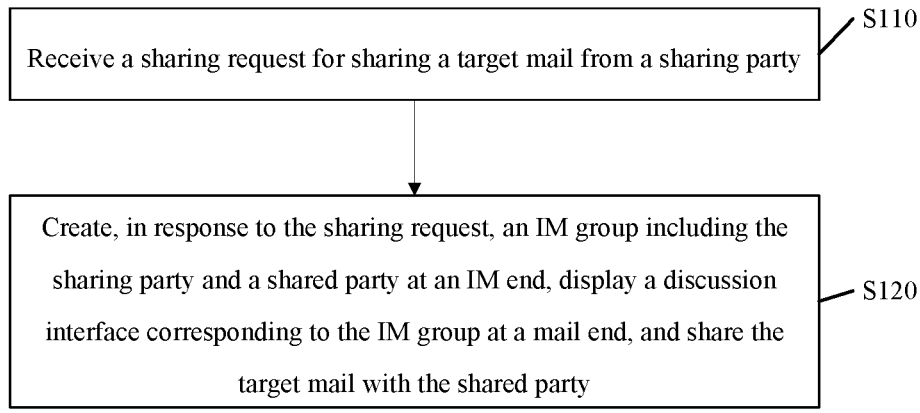
FIG. 1a is a schematic flow chart of a method for exchanging information according to a first embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include additional steps and/or omit a step shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" or the like used in the present disclosure are used to distinguish different devices, modules or units from one another, and are not used to limit an sequential order or interdependence of the functions performed by the devices, modules or units.

It should be noted that the wordings such as "one" and "multiple" used in the present disclosure are illustrative rather than restrictive. Those skilled in the art should understand that the wording should be understood as "one or more" unless otherwise expressly indicated in the context.

The naming of messages or information exchanged between multiple devices in the embodiments of the present disclosure is illustrative, and is not intended to limit the scope of the messages or information.

In the process of implementing the present disclosure, the applicant found that a sharing party in a multi-party communication has to forward a mail to each shared party and then communicates with each shared party one by one or holds an offline face-to-face meeting for discussion, resulting in inefficient information exchange. In view of this, in some embodiments of the present disclosure, a group is created at an instant messaging (IM) end based on a target mail shared by a sharing party, and an interactive interface corresponding to the IM group at the IM end is established at a mail end, so that the sharing party and the shared party can not only exchange information based on the target mail in the IM group at the IM end, but also exchange information in a discussion interface at the mail end. The process of forwarding the mail to each shared party and offline discussion is omitted, improving the information exchange efficiency in multi-party collaboration communication. The mail end and the IM end may be integrated on a client device, and served by a server. The mail end and the IM end respectively correspond to different display interfaces on the client device. A user may click, on the client device, a tab corresponding to the mail end or a tab corresponding to the IM end to achieve switching between the display interface for the mail end and the display interface for the IM end.

First Embodiment

FIG. 1a is a schematic flow chart of a method for exchanging information according to a first embodiment of the present disclosure. The method may be applied in information exchange between a sharer and a shared user. This method may be implemented by a computer, a server or other electronic devices, and includes the following steps S110 and S120.

In step S110, a sharing request for sharing a target mail is received from a sharing party.

In the embodiment, the target mail may be a mail that the sharing party needs to share with the shared party. The target mail may be from the mail end or the instant messaging (IM) end. The sharing party may be a client device used by the sharer of the target mail, and the shared party may be a client device used by the shared user of the target mail. For example, in a case where the target mail is from the mail end, the sharing party may share a newly created draft or a received mail; and in a case where the target mail is from the IM end, the sharing party may share a mail which was shared to the IM end.

The sharing party may specify one shared party or multiple shared parties when sending the sharing request for sharing the target mail, that is, the sharing party may share the target mail to one shared party or multiple shared parties. The number of the shared party is not limited here.

In an embodiment, the target mail includes at least one mail draft or multiple relevant mails with same feature. The target mail in the embodiment may be one or more mail drafts or multiple relevant mails with same feature. The mail draft may be independently created by the sharing party. The relevant mails with same feature may be a collection of mails with at least one feature of: a same subject, being sent in a same preset time range, a same sender, a same recipient, having a reply reference relationship, and having a forwarding reference relationship.

The sharer may send the sharing request for sharing the target mail on a mail interface of the client device used by the sharer, to share the target mail. The client device used by the sharer may include a computer terminal or a mobile phone terminal. A way in which the sharer sends the sharing request includes, but not limited to, the sharer clicking on a button with a sharing function on a display interface of the target mail to generate the sharing request for sharing the target mail.

Figure 1B:
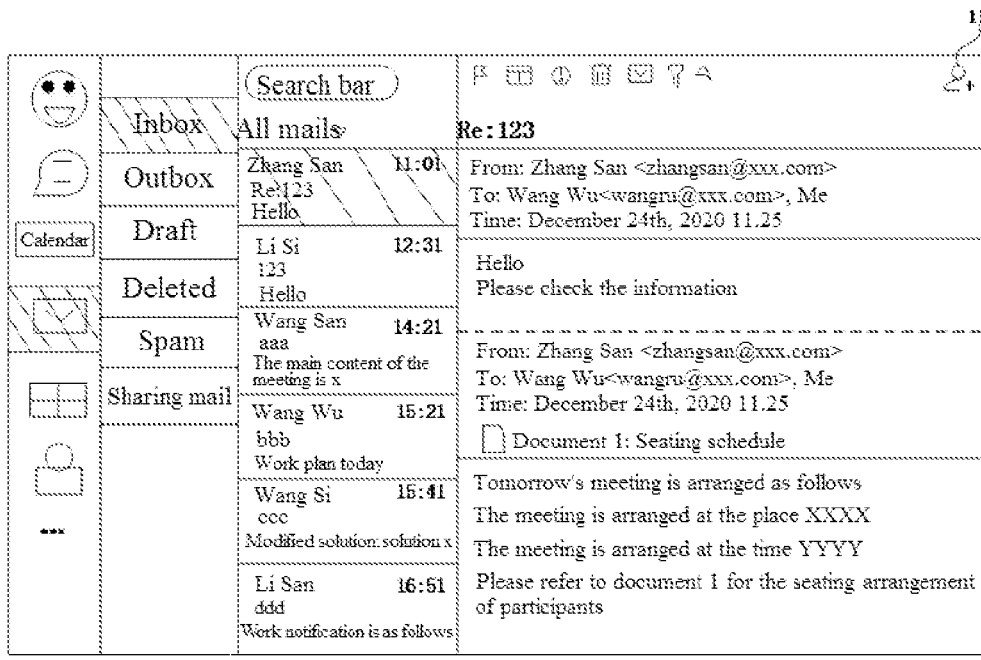
FIG. 1b is a schematic diagram of a display interface at a mail end before sharing a mail, which is applicable in the first embodiment of the present disclosure.

For example, on the mail interface shown in FIG. 1b, if a to-be-shared target mail is a mail replied by Zhang San in an inbox, the sharer may initiate the sharing of the target mail by clicking a sharing button 11 displayed in the upper right corner of a mail content display window for the mail. In this way, the sharer serves as the sharing party of the target mail, and the sharing request is generated. In such case, the server may receive the sharing request sent by the sharing party, which is with respect to the mail replied by Zhang San. In an embodiment, when the sharer triggers the sharing button on the client device of the sharer, a display window of candidate shared parties may pop up, identity information such as avatars of the candidate shared parties, is displayed on the display window. The sharer may select, on the display window, an avatar of a shared party to be shared with the mail, and click a confirm button to generate the sharing request on the client device and send the sharing request to the server.

In step S120, an IM group including the sharing party and a shared party is created at an instant messaging (IM) end in response to the sharing request, a discussion interface corresponding to the IM group is displayed at the mail end, and the target mail is shared with the shared party, to enable information exchange between the sharing party and the shared party in the IM group and/or in the discussion interface based on the target mail.

In the embodiment, on receipt of the sharing request sent by the sharing party, the server may create the IM group including the sharing party and at least one shared party at the IM end based on the target mail, that is, create the IM group associated with the target mail, and add the sharing party and the shared party to the IM group as members of the IM group. A way for sharing the target mail to the shared party includes, but not limited to, displaying the target mail based on the created IM group, to enable information exchange between the sharing party and the shared party in the IM group based on the target mail. After the IM group is created, the sharing party and the shared party as the members of the IM group may conduct online multi-party collaborative information exchange in the IM group based on the displayed target mail. The information exchange includes, but not limited to, text exchange, voice exchange, video exchange and collaborative editing.

In addition, after the IM group including the sharing party and the shared party is created at the IM end in response to the sharing request, the discussion interface corresponding to the IM group may be displayed on the mail end. The discussion interface may be an interactive interface for displaying messages in the IM group in real-time. The sharing party may exchange information with the shared party in the IM group at the IM end and/or the discussion interface at the mail end. The advantage of displaying the discussion interface corresponding to the IM group at the mail end is that even if a currently activated display interface is at the mail end, users may communicate and discuss in the group, which can improve the efficiency of information exchange and improve the user experience.

It should be noted that the expression "sharing a mail" used herein refers to the case that the sharing party shares the target mail to the shared party by created a group, so that the shared party can read and/or edit the target mail. The shared party cannot really own the target mail, that is, the target mail at the shared party will be automatically deleted as the sharing ends.

In an embodiment, after the target mail is shared with the shared party, the method further includes displaying a notification message to the shared party. The notification message may be used to notify the shared party the sharing of the target mail. In this way, the shared party may determine that the target mail is shared when reading the notification message, and then find the target mail from the inbox or other locations.

In an embodiment, after the target mail is shared with the shared party, the method further includes displaying the target mail to at least one of the sharing party and the shared party.

For example, the target mail may be displayed to the sharing party and/or the shared party based on the created IM group. Specifically, an association relationship between the target mail and the IM group may be established. According to the association relationship, the target mail may be displayed in the IM group to at least one of the sharing party and the shared party, or the target mail may be displayed to at least one of the sharing party and the shared party by switching from the display interface at the IM end to the display interface of the mail end.

In an embodiment, the displaying the target mail includes at least one of displaying information of the target mail in a form of a mail card; and creating the mail content display window at the mail end and displaying entire content of the target mail in the mail content display window.

In the embodiment, the mail card may display the information of the target mail, or may be in a form of a link from which the mail content display window is opened. The information of the target mail may include at least one of a title of the mail, information of a sender, information of a recipient and partial content of the mail. In an embodiment, the mail card may be displayed in the IM group at the IM end.

Figure 1C:
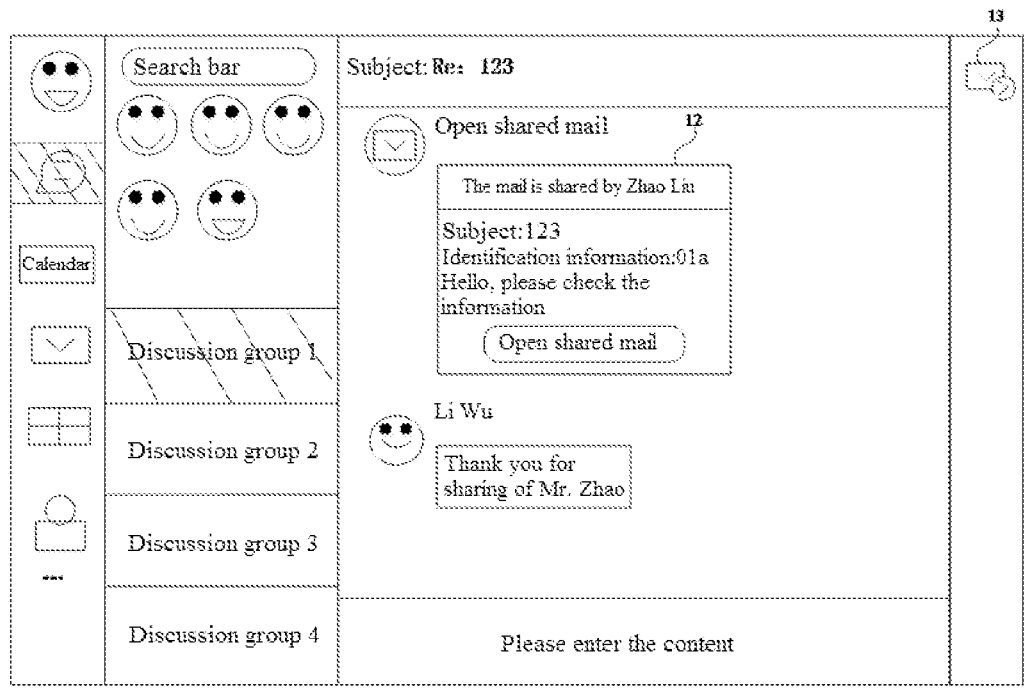
FIG. 1c is a schematic diagram of a display interface at an instant messaging (IM) end, which is applicable in the first embodiment of the present disclosure.
Figure 1D:
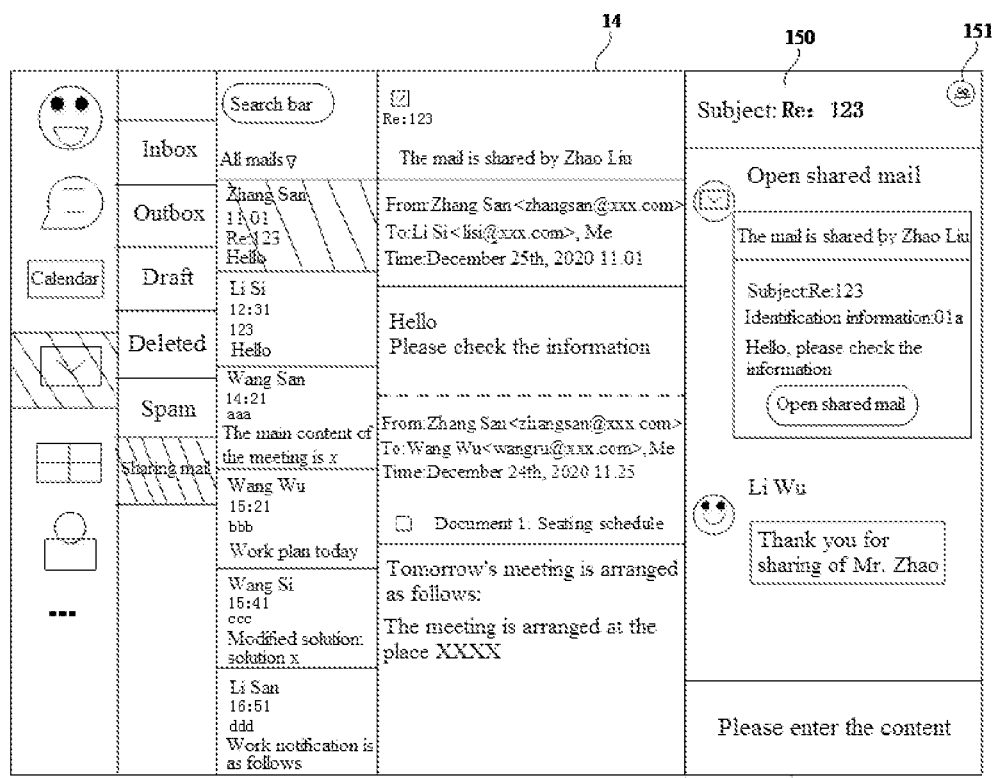
FIG. 1d is a schematic diagram of a display interface at the mail end after sharing the mail, which is applicable in the first embodiment of the present disclosure.

For example, the information of the target mail may be displayed in a form of a mail card 12 in the IM group as shown in FIG. 1c. Alternatively, the mail content display window 14 is displayed in the display interface at the mail end as shown in FIG. 1d to display entire content of the target mail in the mail content display window 14.

In an embodiment, the method may further include receiving a mail display operation triggered by the sharing party or the shared party, and creating the mail content display window at the mail end. That is, the mail content display window may be created in response to the mail display operation, and the client device or the server may create the mail content display window in response to the mail display operation, so as to display the content of the target mail in the mail content display window.

In an embodiment, the method may further include receiving a mail display operation triggered by the sharing party or the shared party, switching from the IM end to the mail end, and displaying the mail content display window corresponding to the target mail at the mail end.

For example, the mail content display window may be created at the mail end. Before triggering the mail display operation, the sharing party or the shared party may be browsing the IM end corresponding to the target mail. After the sharing party or the shared party triggers the mail display operation, the client device may switch from the IM end to the mail end, so that the mail content display window is created at the mail end.

In an embodiment, the method may further include receiving the mail display operation triggered by the sharing party or the shared party, switching from the IM end to the mail end, and displaying the mail content display window corresponding to the target mail at the mail end.

For example, the mail display operation is triggered in the following ways. A user clicks, in the display interface of at the IM end, the mail card displayed in the IM group to trigger the switching from the display interface at the current IM end to the display interface at the mail end. Alternatively, the user clicks a go-to-mail control independently set in the IM group at the IM end to trigger the switching from the display interface at the current IM end to the display interface at the mail end, so as to display the discussion interface and the mail content display window, which is convenient for the user to view the detailed content of the target mail. The user includes the sharer and the shared user.

For example, the user may achieve switching from the display interface at the IM end to the display interface at the mail end by clicking the mail card 12 or clicking a go-to-mail control 13 independently set on a lateral state bar in the IM group, as shown in FIG. 1c, for example, the user may switch from the display interface at the IM end shown in FIG. 1c to the display interface at the mail end shown in FIG. 1d.

In an embodiment, the IM group is forbidden to be converted from being visible only to the members of the group to being visible to all users.

The IM group is created to share a mail. Therefore, the IM group created for mail sharing has higher security requirement than an ordinary group at the IM end. In the embodiment. In the embodiment, the IM group may be forbidden to be converted from being visible only to the members of the group to being visible to all users, that is, an attribute of the IM group is to forbid conversion from a private group to a public group. The private group may be only visible to the members of the group, that is, the private group cannot be acquired by non-members of the group by searching. The public group can be, for example, acquired by non-members of the group by searching. In this way, confidentiality and security of the IM group created based on mail sharing can be improved.

According to the technical solution of the embodiment, a sharing request for sharing the target mail is received from a sharing party, an IM group including the sharing party and a shared party is created at an instant messaging (IM) end in response to the sharing request, a discussion interface corresponding to the IM group is displayed at a mail end, and the target mail is shared with the shared party, to enable information exchange between the sharing party and the shared party in the IM group and/or in the discussion interface based on the target mail. The IM group is created at the IM end based on the target mail and the interactive interface of the IM group is established at the mail end, which can solve the problem of inefficient communication in the conventional technology that the sharing party has to forward the mail to each shared party and then communicates with each shared party one by one or holds an offline face-to-face meeting for discussion, thereby improving the efficiency of information exchange in multi-party collaboration communication.

Based on the above embodiments, in an embodiment, the method may further include: receiving a mail re-sharing request sent by the sharing party or the shared party, and adding, in response to the mail re-sharing request, a new shared party indicated by the mail re-sharing request to the IM group.

For example, after the target mail is shared, the target mail may be shared again. Specifically, the sharing party or the shared party may initiate re-sharing for the shared target mail. On receipt of a re-sharing request for sharing the target mail from the sharing party or the shared party, the server may share the target mail with the new shared party. A way for initiating the re-sharing includes, but not limited to, inviting the new shared party to join the IM group.

For example, for the discussion interface displayed in display interface at the mail end, a tab for adding group member is set in the state bar of the discussion interface at the mail end. When the tab for adding group member is triggered, a candidate window may pop up to display identity information of candidate shared users. The sharer or the shared user with permission to share may initiate a re-sharing request by selecting a candidate shared user. For example, as shown in FIG. 1d, the user may initiate a mail re-sharing request by triggering a tab 151 for adding group member displayed in the state bar 150 of the discussion interface 15.

For example, on receipt of the mail re-sharing request, the server may add a new shared party indicated by the mail re-sharing request to the IM group. Specifically, the mail re-sharing request may include identity of the new shared party selected by the sharing party or the shared party that initiated the request, and the server may add the new shared party to the IM group according to the identity of the new shared party.

In an embodiment, the method may further include refusing, in a case of determining that the IM group only allows re-sharing of the sharing party, the mail re-sharing request sent by the shared party.

In order to constrain permission of shared parties in the IM group to add group member, the sharing party may set the IM group as only allowing re-sharing from the sharing party. For example, the shared party may be prohibited from adding other users into the group by selecting an option of only allowing re-sharing by group owner in the IM group, so as to improve the security of the IM group and the target mail.

In an embodiment, the method may further include: receiving, from the sharing party, an instruction of enabling verification for joining the IM group; and providing a group verification interface in the IM group displayed for the sharing party, in order that the sharing party processes a group verification message at the IM end.

For example, the sharing party may enable the group joining verification for the IM group, so that members of the IM group cannot add a new member to the group by themselves, and the new member cannot join the IM group freely. The new member can join the IM group only after being verified by the sharing party. Specifically, the sharer may enable a group verification function on the client device. For example, the sharer may select an option of the group verification function, to trigger the generation of the instruction of enabling verification for joining the IM group, and send the instruction of enabling verification for joining the IM group to the server. On receipt of the instruction of enabling verification for joining the IM group, the server may enable the group verification function in the IM group displayed at the sharer according to the instruction, that is, provide the group verification interface. When a new member joins the group, prompt information is displayed at the sharing party, so that the sharer can verify whether to allow the new member join the group.

The setting of the group verification function can facilitate the sharing party to manage the group and improve the security of information of the group and the target mail.

Second Embodiment

Figure 2:
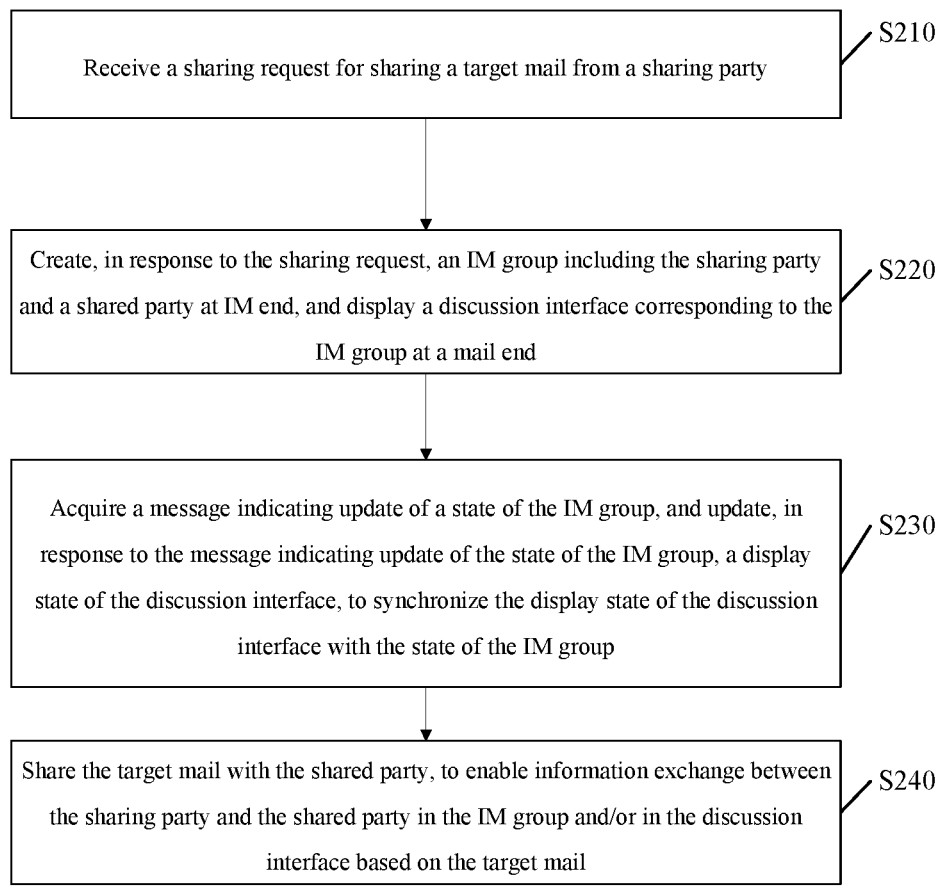
FIG. 2 is a schematic flow chart of a method for exchanging information according to a second embodiment of the present disclosure.

FIG. 2 is a schematic flow chart of a method for exchanging information according to a second embodiment of the present disclosure. The embodiment is specifically described based on all the solutions in the above embodiments, and another method for exchanging information is provided according to the embodiment. Specifically, after the IM group including the sharing party and the shared party is created at the instant messaging (IM) end, and the discussion interface corresponding to the IM group is displayed at the mail end, the method further includes: acquiring a message indicating update of a state of the IM group, and updating a display state of the discussion interface according to the message indicating update of the state of the IM group, to synchronize the display state of the discussion interface with the state of the IM group. Specifically, the method includes the following steps S210 to S240.

In step S210, the sharing request for sharing the target mail is received from the sharing party.

In step S220, the IM group including the sharing party and the shared party is created at the IM end in response to the sharing request, and the discussion interface corresponding to the IM group is displayed at the mail end.

In step S230, a message indicating update of a state of the IM group is acquired, and a display state of the discussion interface is updated according to the message indicating update of the state of the IM group, to synchronize the display state of the discussion interface with the state of the IM group.

In the embodiment, when the IM group including the sharing party and the shared party is created on the IM end, the discussion interface corresponding to the IM group is displayed on the mail end. Therefore there is need to ensure that the state of the IM group is kept in conformity with the display state of the discussion interface on the mail end. For example, when the user enters and sends new information in the IM group at the IM end, the new information is to be synchronously displayed on the discussion interface at the mail end, to ensure that information displayed in the IM group is kept in conformity with information displayed on the discussion interface. In this way, the user may determine to operate on the IM group or on the discussion interface as needed, thereby improving the flexibility of information exchange and improving the user experience.

For example, the display state of the discussion interface at the mail end may be updated in real time according to the state of the IM group. Specifically, the message indicating update of the state of the IM group is first acquired, where the message indicating update of the state of the IM group may be generated when the state of the IM group is updated. After acquiring the message indicating update of the state of the IM group, the server may update the display state of the discussion interface according to the message, so as to keep the state of the IM group in conformity with the display state of the discussion interface.

In an embodiment, the acquiring a message indicating update of a state of the IM group includes: acquiring a first state-update operation triggered by the sharing party or the shared party for the IM group, and updating the state of the IM group in response to the first state-update operation, and acquiring the message indicating update of the state of the IM group corresponding to the updated state of the IM group.

The first state-update operation may be performed by the sharing party or the shared party on the IM group. For example, the user enters a text in the IM group and clicks to send the text, or the user initiates an operation of adding a new member to the IM group.

For example, the server may update the state of the IM group when acquiring the first state-update operation. For example, in a case that the first state-update operation is that the user enters a text in the IM group and clicks to send the text, updating the state of the IM group may include updating the discussion information displayed in the IM group. For example, in a case that the first state-update operation is that the user initiates an operation of adding a new member to the IM group, information of the members of the IM group is updated. The server may acquire the message indicating update of the state of the IM group corresponding to the updated state of the IM group, so as to update the display state of the discussion interface, such as, acquiring the displayed discussion information in the updated IM group, or acquiring the displayed information of the members of the updated IM group.

In an embodiment, the acquiring a message indicating update of a state of the IM group includes acquiring a second state-update operation triggered by the sharing party or the shared party for the discussion interface; and updating, in response to the second state-update operation, the state of the IM group, and acquiring the message indicating update of the state of the IM group corresponding to the updated state of the IM group.

The second state-update operation may be a message sent by the sharing party or the shared party for the discussion interface. For example, the user enters a text in the discussion interface at the mail end and clicks to send the text, or the user initiates, on the discussion interface at the mail end, an operation of adding a new member to the IM group.

For example, the server may update the state of the IM group when acquiring the second state-update operation triggered by a user. For example, in a case that the second state-update operation is that the user enters a text in the discussion interface at the mail end and click to send the text, the updating the state of the IM group may be updating the displayed discussion information in the IM group. For example, in a case that the second state-update operation is that the user initiates, in the discussion interface at the mail end, an operation of adding a new member to the IM group, information of the members of the IM group is updated. The server may acquire the message indicating update of the state of the IM group corresponding to the updated state of the IM group, so as to update the display state of the discussion interface, such as, acquiring the displayed discussion information in the updated IM group, or acquiring the displayed information of the members of the updated IM group.

It should be noted that the updating the state of the IM group in response to the second state-update operation includes, but not limited to, calling, at the mail end, an information interface of the IM group, and then transmitting information about operation of the user at the mail end to the IM end, so as to update the state of the IM group.

In an embodiment, the updating the display state of the discussion interface according to the message indicating update of the state of the IM group includes: adding the message indicating update of the state of the IM group to a group message queue; and updating, in response to the message indicating update of the state of the IM group in the group message queue, the display state of the discussion interface.

In the embodiment, a group message queue corresponding to the IM group may be maintained in the server to assist in updating the display state of the discussion interface. For example, every time the state of the IM group is updated, the message indicating update of the state of the IM group may be added to the group message queue corresponding to the IM group. Any other end (such as the mail end) may subscribe to the group message queue, sequentially call the message indicating update of the state of the IM group added to the group message queue, and update, in response to the message indicating update of the state of the IM group, the display state of the display interface corresponding to the IM group.

Based on the above embodiments, in an embodiment, the message indicating update of the state of the IM group may include at least one of: a message indicating that an existing member withdraws from the group, a message indicating that a new member joins the group, a message indicating dissolution of the group, a message indicating updated discussion information in the group, and a message indicating that the updated discussion information in the group is read.

It should be noted that steps S230 and S240 may be simultaneously performed, or step S230 is performed after step S240 is performed. An order of performing the steps S230 and S240 is not limited herein.

In step S240, the target mail is shared with the shared party, to enable information exchange between the sharing party and the shared party in the IM group and/or in the discussion interface based on the target mail.

Based on the above embodiments, according to the technical solution of the embodiment, a message indicating update of a state of the IM group is acquired, and a display state of the discussion interface is updated in response to the message indicating update of the state of the IM group, so that the display state of the discussion interface is kept in conformity with the state of the IM group. Accordingly, the user may operate in the IM group or on the discussion interface as needed, thereby improving the flexibility of information exchange and improving the user experience.

Third Embodiment

Figure 3:
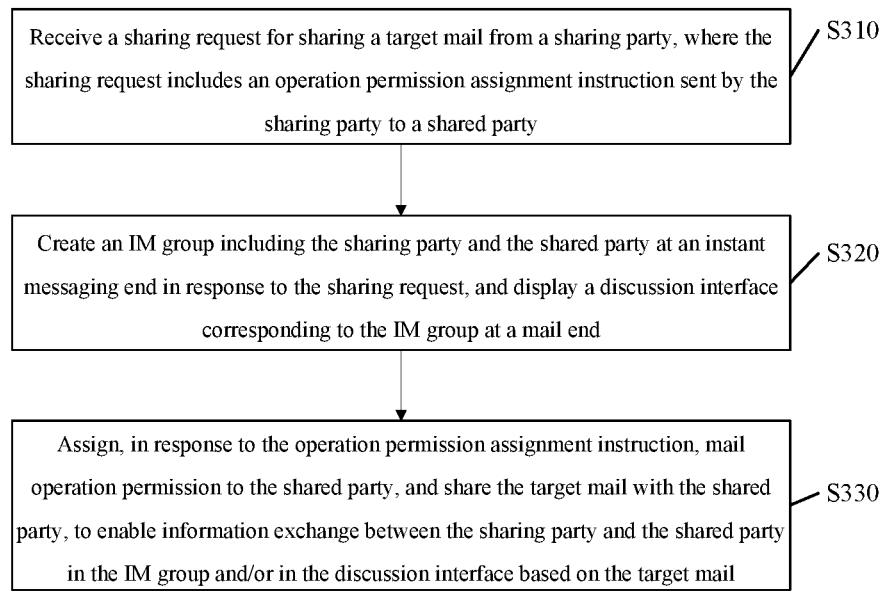
FIG. 3 is a schematic flow chart of a method for exchanging information according to a third embodiment of the present disclosure.

FIG. 3 is a schematic flow chart of a method for exchanging information according to a third embodiment of the present disclosure. The embodiment is specifically described based on all the solutions in the above embodiments, and another method for exchanging information is provided according to the embodiment. Specifically, the sharing request includes an operation permission assignment instruction sent by the sharing party to the shared party, and after the sharing request for sharing the target mail is received from the sharing party at the mail end, the method further includes: assigning, in response to the operation permission assignment instruction, mail operation permission to the shared party. Specifically, the method includes the following steps S310 to S330.

In step S310, the sharing request for sharing the target mail is received from the sharing party. The sharing request includes an operation permission assignment instruction sent by the sharing party to the shared party.

In step S320, the IM group including the sharing party and the shared party is created at the instant messaging IM end in response to the sharing request, and the discussion interface corresponding to the IM group is displayed at the mail end.

In step S330, the mail operation permission is assigned to the shared party in response to the operation permission assignment instruction, and the target mail is shared with the shared party, to enable information exchange between the sharing party and the shared party in the IM group and/or in the discussion interface based on the target mail.

Based on the above embodiments, according to the embodiment, mail operation permission may be assigned to the shared party when the IM group is created based on the target mail shared by the sharing party. Specifically, the assigned mail operation permission may be permission assigned by the sharing party to the shared party, indicating operation allowed on the target mail. The sharing request from the sharing party may include the operation permission assignment instruction sent by the sharing party to the shared party. After receiving the operation permission assignment instruction, the server may assign, in response to the operation permission assignment instruction, the mail operation permission to the shared party when creating the IM group.

The beneficial effect of setting the mail operation permission is that permission may be assigned to each shared party according to the requirements of the sharing party, so that the shared party can operate the target mail within scope of respective permissions, so as to facilitate the collaboration management of the target mail.

In an embodiment, the mail operation permission includes at least one of: permission to edit, permission to read and permission to share. The permission to edit allows for editing to content of the target mail, such as writing, modifying, commenting on the content of the target mail. The permission to read allows for reading and viewing the content of the target mail, for example, opening the target mail and viewing the detailed content of the target mail. The permission to share allows for re-sharing the target mail, for example, sharing the target mail with other users and inviting other users to join the group.

In an embodiment, the method may further include receiving an operation instruction for the IM group sent by the sharing party or the shared party; and cancelling or partially cancelling, in response to the operation instruction for the IM group, the mail operation permission assigned to the shared party.

In the embodiment, after the sharing party shares the target mail, the sharing of the target mail may be cancelled or partially cancelled in response to the operation instruction for the IM group sent by the sharing party or the shared party. That is, the mail operation permission assigned by the sharing party to each shared party may be cancelled, or the mail operation permission assigned by the sharing party to some of the shared parties is cancelled. The operation instruction for the IM group includes, but not limited to, instructions such as withdrawing from the group, dissolving the group and cancelling sharing.

It should be noted that the shared party whose the mail operation permission is cancelled has no permission to operate on the target mail, for example, not allowed to edit, read, share and perform other operations on the target mail, so as to cancel or partially cancel the sharing of the target mail. In addition, the operation instruction for the IM group includes, but not limited to, an instruction generated when the sharing party or the shared party operates in the IM group at the IM end, and an instruction generated when the sharing party or the shared party operates in the discussion interface at the mail end.

In an embodiment, the receiving an operation instruction for the IM group sent by the sharing party or the shared party and cancelling or partially cancelling, in response to the operation instruction for the IM group, the mail operation permission assigned to the shared party includes: receiving a mail sharing cancellation instruction trigger for the IM group by the sharing party; and cancelling, in response to the mail sharing cancellation instruction, the mail operation permission assigned to the shared party.

In an embodiment, the receiving an operation instruction for the IM group sent by the sharing party or the shared party and cancelling or partially cancelling, in response to the operation instruction for the IM group, the mail operation permission assigned to the shared party includes: receiving a first operation instruction for withdrawing from the IM group sent by the sharing party; and removing, in response to the first operation instruction for withdrawing from the IM group, the sharing party from the IM group, closing the discussion interface of the sharing party, and cancelling the mail operation permission assigned to the shared party.

In an embodiment, the receiving an operation instruction for the IM group sent by the sharing party or the shared party and cancelling or partially cancelling, in response to the operation instruction for the IM group, the mail operation permission assigned to the shared party includes: receiving a group dissolution operation instruction for the IM group sent by the sharing party; and dissolving, in response to the group dissolution operation instruction, the IM group, closing the discussion interface, and cancelling the mail operation permission assigned to the shared party.

In an embodiment, the receiving an operation instruction for the IM group sent by the sharing party or the shared party and cancelling or partially cancelling, in response to the operation instruction for the IM group, the mail operation permission assigned to the shared party includes: receiving a second operation instruction for withdrawing from the IM group sent by a target shared party; and removing, in response to the second group operation instruction, the target shared party from the IM group, closing the discussion interface of the target shared party, and cancelling the mail operation permission assigned to the target shared party.

In the embodiment, cancelling the sharing of the target mail may include: the sharing party actively cancelling the sharing, the sharing party withdrawing from the group, or the sharing party dissolving the group. Partially cancelling the sharing of the target mail may include the shared party withdrawing from the group. Specifically, the mail operation permission assigned to the shared party in the IM group is cancelled or partially cancelled, to cancel or partially cancel the sharing of the target mail.

In an example, the sharing party may trigger the generation of the mail sharing cancellation instruction by clicking on a cancel sharing button set at the IM end or the mail end, so that the sharing party can actively cancel the sharing of the target mail. After receiving the mail sharing cancellation instruction sent by the sharing party, the server may query each shared party in the IM group who has mail operation permission for the target mail, and cancel the mail operation permission assigned to each shared party with respect to the target mail, so that the shared party is no longer allowed to operate on the target mail.

In another example, the sharing party may trigger the generation of the first operation instruction for withdrawing from the IM group by clicking on a withdrawing from group button displayed on the display interface of the IM group at the IM end or the discussion interface at the mail end, so that the sharer can withdraw from the IM group and cancel the sharing of the target mail. After receiving the first operation instruction for withdrawing from the IM group sent by the sharing party, the server may remove the sharing party from the IM group and close the discussion interface at the mail end of the sharing party, query each shared party in the IM group who has mail operation permission for the target mail, and cancel the mail operation permission assigned to each shared party with respect to the target mail, so that the shared party is no longer allowed to operate on the target mail.

In another example, the sharing party may trigger the generation of the group dissolution operation instruction by clicking on a group dissolution button displayed on the display interface of the IM group at the IM end or the discussion interface at the mail end, so as to dissolve the IM group and cancel the sharing of the target mail. After receiving the group dissolution operation instruction sent by the sharing party, the server dissolves the IM group and closes the discussion interface at the mail end of the sharing party and each the shared party, and query each shared party in the IM group who has mail operation permission for the target mail, and cancel the mail operation permission assigned to each shared party with respect to the target mail, so that the shared party is no longer allowed to operate on the target mail.

In another example, the target shared party may trigger the generation of the second operation instruction for withdrawing from the IM group by clicking on a withdrawing from group button displayed on the display interface of the IM group at the IM end or the discussion interface at the mail end, so that the target shared party can withdraw from the IM group and cancel the sharing of the target mail. After receiving the second operation instruction for withdrawing from the IM group sent by the target shared party, the server may remove the target shared party from the IM group and close the discussion interface at the mail end of the target shared party, and cancel the mail operation permission assigned to the target shared party with respect to the target mail, so that the target shared party is no longer allowed to operate on the target mail.

According to the technical solutions of the embodiment, a sharing request for sharing a target mail is received from a sharing party, where the sharing request includes an operation permission assignment instruction sent by the sharing party to the shared party, an IM group including the sharing party and a shared party is created at an IM end in response to the sharing request and a discussion interface corresponding to the IM group is displayed at the mail end. In addition, mail operation permission is assigned to the shared party in response to the operation permission assignment instruction, and the target mail is shared with the shared party, to enable information exchange between the sharing party and the shared party in the IM group and/or the discussion interface based on the target mail, and different mail operation permissions are set for different shared parties, so as to facilitate the multi-party collaboration operation on the shared mail, and further improve the efficiency of the efficiency of information exchange in multi-party collaboration communication.

Fourth Embodiment

Figure 4:
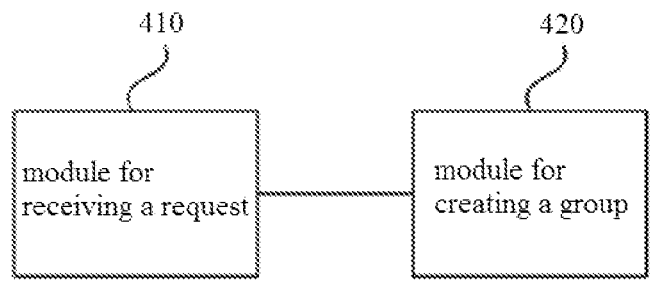
FIG. 4 is a schematic flow chart of an apparatus for exchanging information according to a fourth embodiment of the present disclosure.

FIG. 4 is a schematic flow chart of an apparatus for exchanging information according to a fourth embodiment of the present disclosure. As shown in FIG. 4, the apparatus for exchanging information includes a module 410 for receiving a request and a module 420 for creating a group. Each module is described in detail below.

The module 410 for receiving a request is configured to receive a sharing request for sharing a target mail from a sharing party.

The module 420 for creating a group is configured to create, in response to the sharing request, an instant messaging (IM) group including the sharing party and a shared party at an IM end, display a discussion interface corresponding to the IM group at a mail end, and share the target mail with the shared party, to enable information exchange between the sharing party and the shared party in the IM group and/or the discussion interface based on the target mail.

According to the technical solution of the embodiment, a sharing request for sharing the target mail from a sharing party is received, an IM group including the sharing party and a shared party is created at an IM end in response to the sharing request, a discussion interface corresponding to the IM group is displayed at a mail end, and the target mail is shared with the shared party, to enable information exchange between the sharing party and the shared party in the IM group and/or the discussion interface based on the target mail. The IM group is created at the IM end based on the target mail and the interactive interface of the IM group is established at the mail end, which can solve the problem of inefficient communication in the conventional technology that the sharing party has to forward the mail to each shared party, and then communicates with each shared party one by one or holds an offline face-to-face meeting for discussion, thereby improving the efficiency of information exchange in multi-party collaboration communication.

In an embodiment, the apparatus further includes a state synchronization module. The state synchronization module is configured to, after the IM group including a sharing party and the shared party is created at an IM end and the discussion interface corresponding to the IM group is displayed at a mail end, acquire a message indicating update of a state of the IM group, and update, in response to the message indicating update of the state of the IM group, a display state of the discussion interface, to synchronize the display state of the discussion interface with the state of the IM group.

In an embodiment, the state synchronization module may include a first state acquiring sub-module and a first information acquiring sub-module. The first state acquiring sub-module is configured to acquire a first state-update operation triggered by the sharing party or the shared party for the IM group. The first information acquiring sub-module is configured to update, in response to the first state-update operation, the state of the IM group, and acquire the message indicating update of the state of the IM group corresponding to the updated state of the IM group.

In an embodiment, the state synchronization module may further include a second state acquiring sub-module and a second information acquiring sub-module. The second state acquiring sub-module is configured to acquire a second state-update operation triggered by the sharing party or the shared party for the discussion interface. The second information acquiring sub-module is configured to update, in response to the second state-update operation, the state of the IM group, and acquire the message indicating update of the state of the IM group corresponding to the updated state of the IM group.

In an embodiment, the state synchronization module may further include a group queue adding sub-module and a display state update sub-module. The group queue adding sub-module is configured to add the message indicating update of the state of the IM group to a group message queue. The display state update sub-module is configured to update, in response to the message indicating update of the state of the IM group in the group message queue, the display state of the discussion interface.

In an embodiment, the message indicating update of the state of the IM group includes at least one of: a message indicating that an existing member withdraws from the group, a message indicating that a new member joins the group, a message indicating dissolution of the group, a message indicating updated discussion information in the group, and a message indicating that the updated discussion information in the group is read.

In an embodiment, the module for creating a group may further include a notification message display module. The notification message display module is configured to display a notification message to the shared party, where the notification message is used to notify the shared party the sharing of the target mail.

In an embodiment, the apparatus may further include a mail display module. The mail display module is configured to display the target mail to at least one of the sharing party and the shared party after the target mail is shared with the shared party.

In an embodiment, the mail display module may include a card display sub-module and a content display sub-module. The card display sub-module is configured to display information of the target mail in a form of a mail card. The content display sub-module is configured to display a mail content display window at the mail end and displaying entire content of the target mail in the mail content display window.

In an embodiment, the mail display module may further include a window creating sub-module. The window creating sub-module is configured to receive a mail display operation triggered by the sharing party or the shared party, and creating the mail content display window at the mail end.

In an embodiment, the mail display module may further include an interface switching sub-module. The interface switching sub-module is configured to receive a mail display operation triggered by the sharing party or the shared party, switch from the IM end to the mail end, and display the mail content display window corresponding to the target mail at the mail end.

In an embodiment, the mail display module may further include a control display sub-module. The control display sub-module is configured to create and display a go-to-mail control based on a display location of the IM group at the IM end, where the go-to-mail control is used to trigger the mail display operation.

In an embodiment, the mail display module is further configured to receive a mail display operation triggered by the sharing party or the shared party in the discussion interface, and display a mail content display window corresponding to the target mail at the mail end.

In an embodiment, the sharing request includes an operation permission assignment instruction sent by the sharing party to the shared party.

In an embodiment, the apparatus may further include a permission allocation module. After the sharing request for sharing the target mail is received from the sharing party, the permission allocation module is configured to assign, in response to the operation permission assignment instruction, mail operation permission to the shared party.

In an embodiment, the apparatus may further include a permission cancel module. The permission cancel module is configured to receive an operation instruction for the IM group triggered by the sharing party or the shared party; and cancelling or partially cancelling, in response to the operation instruction for the IM group, the mail operation permission assigned to the shared party.

In an embodiment, the permission cancel module is specifically configured to receive a mail sharing cancellation instruction for the IM group trigger by the sharing party; and cancel, in response to the mail sharing cancellation instruction, the mail operation permission assigned to the shared party.

In an embodiment, the permission cancel module is further specifically configured to receive a first operation instruction for withdrawing from the IM group sent by the sharing party; and remove, in response to the first operation instruction for withdrawing from the IM group, the sharing party from the IM group, close the discussion interface of the sharing party, and cancel the mail operation permission assigned to the shared party.

In an embodiment, the permission cancel module is further specifically configured to receive a group dissolution operation instruction for the IM group sent by the sharing party; and dissolve, in response to the group dissolution operation instruction, the IM group, close the discussion interface, and cancel the mail operation permission assigned to the shared party.

In an embodiment, the permission cancel module is further specifically configured to receive a second operation instruction for withdrawing from the IM group sent by a target shared party; and remove, in response to the second group operation instruction, the target shared party from the IM group, close the discussion interface of the target shared party, and cancel the mail operation permission assigned to the target shared party.

In an embodiment, the mail operation permission includes at least one of: permission to edit, permission to read and permission to share.

In an embodiment, the IM group is forbidden to be converted from being visible only to members of the group to being visible to all users.

In an embodiment, the apparatus may further include an adding-request receiving module and a member adding module. The adding-request receiving module is configured to receive a mail re-sharing request sent by the sharing party or the shared party. The member adding module is configured to add, in response to the mail re-sharing request, a new shared party indicated by the mail re-sharing request to the IM group.

In an embodiment, the apparatus may further include a request refusing module. The request refusing module is configured to refuse, in a case of determining that the IM group only allows re-sharing of the sharing party, the mail re-sharing request sent by the shared party.

In an embodiment, the apparatus may further include an enabling-instruction receiving module and an interface providing module. The enabling-instruction receiving module is configured to receive, from the sharing party, an instruction of enabling verification for joining the IM group. The interface providing module is configured to provide a group verification interface in the IM group displayed for the sharing party, in order that the sharing party processes a group verification message at the IM end.

The above apparatus may implement the method according to any one of the embodiments of the present disclosure, and has the same functions and beneficial effects as the method.

Fifth Embodiment

Figure 5:
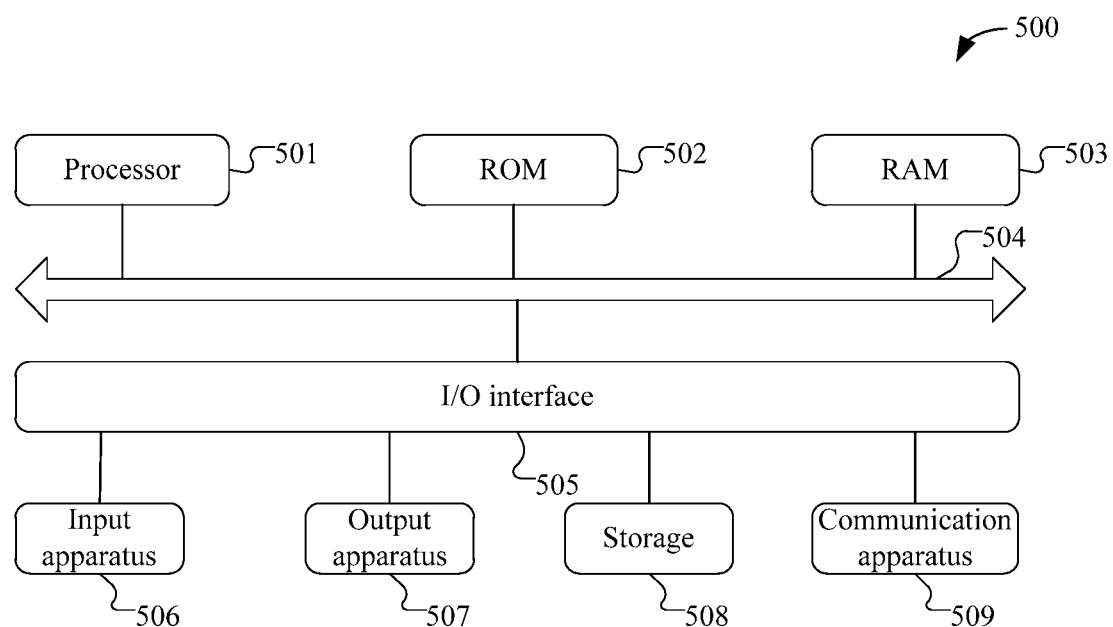
FIG. 5 is a schematic structural diagram showing hardware of an electronic device according to a fifth embodiment of the present disclosure.

Reference is made to FIG. 5, which is a schematic structural diagram of an electronic device 500 applicable in the embodiments of the present disclosure. The electronic device according to the embodiment of the present disclosure is intended to represent various forms of digital computers, such as a laptop, a desktop computer, a working platform, a personal digital assistant, a server, a blade server, a mainframe computer, and other suitable computers. The electronic device shown in FIG. 5 is only exemplary, and should not indicate any limitation to the function and scope of application of the embodiments of the present disclosure.

As shown in FIG. 5, the electronic device 500 may include a processor 501 (such as a central processing unit or a graphics processor), which may execute various operations and processing based on a program stored in a read only memory (ROM) 502 or a program loaded from a storage 508 into a random access memory (RAM) 503. The RAM 503 is further configured to store various programs and data required by the electronic device 500. The processor 501, the ROM 502 and the RAM 503 are connected to each other via a bus 504. An input/output (I/O) interface 505 is also connected to the bus 504.

Generally, the I/O interface 505 may be connected to: an input apparatus 506, such as a touch screen, a touch panel, a keyboard, a mouse, a camera, a microphone, an accelerometer, and a gyroscope; an output apparatus 507, such as a liquid crystal display (LCD), a speaker, and a vibrator; the storage 508 such as a magnetic tape and a hard disk; and a communication apparatus 509. The communication apparatus 509 enables wireless or wired communication between the electronic device 500 and other devices for data exchanging. Although FIG. 5 shows an electronic device 500 having various apparatuses, it should be understood that the illustrated apparatuses are not required to all be implemented or embodied. Alternatively, more or fewer apparatuses may be implemented or included.

Particularly, according to an embodiment of the present disclosure, the process described above in conjunction with flow charts may be implemented as a computer program. For example, a computer program product is further provided according to an embodiment of the present disclosure, including a computer program carried on a computer readable medium. The computer program includes program codes for performing the method shown in the flow chart. In the embodiment, the computer program may be downloaded and installed from the network via the communication apparatus 509, or installed from the storage 508, or installed from the ROM 502. The computer program, when being executed by the processor 501, implements the functions defined in the method according to the embodiment of the present disclosure.

It should be noted that, the computer readable medium according to the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to a wire, an optical cable, radio frequency and the like, or any proper combination thereof.

The computer readable medium may reside in the electronic device, or may stand alone without being assembled into the electronic device.

The computer readable medium carries one or more programs. The one or more programs, when executed by the electronic device, cause the electronic device to: receive, from a sharing party, a sharing request for sharing a target mail; and create, in response to the sharing request, an instant messaging IM group comprising the sharing party and a shared party at an IM end, display a discussion interface corresponding to the IM group at a mail end, and share the target mail with the shared party, to enable information exchange between the sharing party and the shared party in the IM group and/or in the discussion interface based on the target mail.

Alternatively, the computer readable medium carries one or more programs. The one or more programs, when executed by the electronic device, cause the electronic device to: receive, from a sharing party, a sharing request for sharing a target mail; and create, in response to the sharing request, an instant messaging IM group comprising the sharing party and a shared party at an IM end, display a discussion interface corresponding to the IM group at a mail end, and share the target mail with the shared party, to enable information exchange between the sharing party and the shared party in the IM group and/or in the discussion interface based on the target mail.

The computer program codes for performing the operations disclosed in the embodiments of the present disclosure may be written in one or more programming languages or combinations thereof. The programming languages include but not limited to an object-oriented programming language, such as Java, Smalltalk, and C++, and a conventional procedural programming language, such as C language or a similar programming language. The program codes may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flow charts and block diagrams in the drawings illustrate the architecture, functions and operations that can be implemented by the system, method and computer program product according to the embodiments of the present disclosure. Each block in a flow chart or a block diagram may represent a module, a program segment, or a part of code, and part of the module, program segment, or part of code includes one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or actions, or may be realized by a combination of dedicated hardware and computer instructions.

The modules or units mentioned in the description of the embodiments of the present disclosure may be implemented by means of software, or otherwise by means of hardware. A name of the module or unit does not constitute a limitation to the module or unit in some cases. For example, the module for receiving a request may further be described as "a module for receiving a sharing request for sharing a target mail from a sharing party"

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features (but not limited to) having similar functions disclosed in the present disclosure.

The invention claimed is:

1. A method for exchanging information, comprising:
   receiving, from a sharing party, a sharing request for sharing a target mail; and
   creating, in response to the sharing request, an instant messaging IM group comprising the sharing party and a shared party at an IM end, displaying a discussion interface corresponding to the IM group at a mail end, and sharing the target mail with the shared party, to enable information exchange between the sharing party and the shared party in the IM group and/or in the discussion interface based on the target mail,
   wherein after creating the IM group comprising the sharing party and the shared party at the IM end and displaying the discussion interface corresponding to the IM group at the mail end, the method further comprises:
   acquiring a message indicating update of a state of the IM group, and
   updating, in response to the message indicating update of the state of the IM group, a display state of the discussion interface, to synchronize the display state of the discussion interface with the state of the IM group.

2. The method according to claim 1, wherein the acquiring a message indicating update of a state of the IM group comprises:
   acquiring a first state-update operation triggered for the IM group by the sharing party or the shared party, and
   updating, in response to the first state-update operation, the state of the IM group, and acquiring the message indicating update of the state of the IM group corresponding to the updated state of the IM group.

3. The method according to claim 1, wherein the acquiring a message indicating update of a state of the IM group comprises:
   acquiring a second state-update operation triggered for the discussion interface by the sharing party or the shared party; and
   updating, in response to the second state-update operation, the state of the IM group, and acquiring the message indicating update of the state of the IM group corresponding to the updated state of the IM group.

4. The method according to claim 1, wherein the updating a display state of the discussion interface according to the message indicating update of the state of the IM group comprises:
   adding the message indicating update of the state of the IM group to a group message queue; and
   updating, in response to the message indicating update of the state of the IM group in the group message queue, the display state of the discussion interface.

5. The method according to claim 1, wherein the message indicating update of the state of the IM group comprises at least one of:
   a message indicating that an existing member withdraws from the group, a message indicating that a new member joins the group, a message indicating dissolution of the group, a message indicating updated discussion information in the group, and a message indicating that the updated discussion information in the group is read.

6. The method according to claim 1, wherein the sharing the target mail with the shared party comprises:
   displaying a notification message to the shared party, wherein the notification message is used to notify the shared party the sharing of the target mail.

7. The method according to claim 1, wherein after sharing the target mail with the shared party, the method further comprises:
   displaying the target mail to at least one of the sharing party and the shared party.

8. The method according to claim 7, wherein the displaying the target mail comprises at least one of:
   displaying information of the target mail in a form of a mail card; and creating a mail content display window at the mail end and displaying entire content of the target mail in the mail content display window.

9. The method according to claim 8, wherein the creating a mail content display window at the mail end comprises:
receiving a mail display operation triggered by the sharing party or the shared party, and creating the mail content display window at the mail end.

10. The method according to claim 8, wherein the creating a mail content display window at the mail end comprises:
receiving a mail display operation triggered by the sharing party or the shared party,
switching from the IM end to the mail end, and
displaying, at the mail end, the mail content display window corresponding to the target mail.

11. The method according to claim 10, wherein before receiving the mail display operation triggered by the sharing party or the shared party, the method further comprises:
creating and displaying a go-to-mail control based on a display location of the IM group at the IM end, wherein the go-to-mail control is configured to trigger the mail display operation.

12. The method according to claim 1, further comprising:
receiving a mail display operation triggered by the sharing party or the shared party in the discussion interface, and
displaying, at the mail end, a mail content display window corresponding to the target mail.

13. The method according to claim 1, wherein the sharing request comprises an operation permission assignment instruction sent from the sharing party to the shared party, and
after receiving the sharing request from the sharing party at the mail end, the method further comprises:
assigning, in response to the operation permission assignment instruction, a mail operation permission to the shared party.

14. The method according to claim 13, further comprising:
receiving an operation instruction for the IM group triggered by the sharing party or the shared party; and
cancelling or partially cancelling, in response to the operation instruction for the IM group, the mail operation permission assigned to the shared party.

15. The method according to claim 14, wherein the receiving an operation instruction for the IM group sent by the sharing party or the shared party and cancelling or partially cancelling, in response to the operation instruction for the IM group, the mail operation permission assigned to the shared party comprises:
receiving a mail sharing cancellation instruction triggered for the IM group by the sharing party; and
cancelling, in response to the mail sharing cancellation instruction, the mail operation permission assigned to the shared party.

16. The method according to claim 14, wherein the receiving an operation instruction for the IM group sent by the sharing party or the shared party and cancelling or partially cancelling, in response to the operation instruction for the IM group, the mail operation permission assigned to the shared party comprises:
receiving a first operation instruction for withdrawing from the IM group sent by the sharing party; and
removing, in response to the first operation instruction for withdrawing from the IM group, the sharing party from the IM group, closing the discussion interface of the sharing party, and cancelling the mail operation permission assigned to the shared party.

17. The method according to claim 14, wherein the receiving an operation instruction for the IM group sent by the sharing party or the shared party and cancelling or partially cancelling, in response to the operation instruction for the IM group, the mail operation permission assigned to the shared party comprises:
receiving a group dissolution operation instruction for the IM group sent by the sharing party; and
dissolving, in response to the group dissolution operation instruction, the IM group, closing the discussion interface, and cancelling the mail operation permission assigned to the shared party.

18. The method according to claim 14, wherein the receiving an operation instruction for the IM group sent by the sharing party or the shared party and cancelling or partially cancelling, in response to the operation instruction for the IM group, the mail operation permission assigned to the shared party comprises:
receiving a second operation instruction for withdrawing from the IM group sent by a target shared party; and
removing, in response to the second group operation instruction for withdrawing from the IM group, the target shared party from the IM group, closing the discussion interface of the target shared party, and cancelling the mail operation permission assigned to the target shared party.

19. The method according to claim 13, wherein the mail operation permission comprises at least one of permission to edit, permission to read and permission to share.

20. The method according to claim 1, wherein the IM group is forbidden to be converted from being visible only to members of the group to being visible to all users.

21. The method according to claim 1, further comprising:
receiving a mail re-sharing request sent by the sharing party or the shared party; and
adding, in response to the mail re-sharing request, a new shared party indicated by the mail re-sharing request to the IM group.

22. The method according to claim 21, further comprising:
refusing, in a case of determining that the IM group only allows re-sharing of the sharing party, the mail re-sharing request sent by the shared party.

23. The method according to claim 21, further comprising:
receiving, from the sharing party, an instruction of enabling verification for joining the IM group; and
providing a group verification interface in the IM group displayed for the sharing party, in order that the sharing party processes a group verification message at the IM end.

24. An electrical device, comprising
one or more processors; and
a memory for storing one or more programs, wherein
the one or more processors, when executing the one or more programs, perform:
receiving, from a sharing party, a sharing request for sharing a target mail; and
creating, in response to the sharing request, an instant messaging IM group comprising the sharing party and a shared party at an IM end, displaying a discussion interface corresponding to the IM group at a mail end, and sharing the target mail with the shared party, to enable information exchange between the sharing party and the shared party in the IM group and/or in the discussion interface based on the target mail; and acquiring a message indicating update of a state of the IM group, and updating, in response to the message indicating update of the state of the IM group, a display state of the discussion interface, to synchronize the display state of the discussion interface with the state of the IM group.

25. A non-transitory computer readable storage medium, storing a computer program, wherein
the computer program, when being executed by a processor, performs:
receiving, from a sharing party, a sharing request for sharing a target mail; and
creating, in response to the sharing request, an instant messaging IM group comprising the sharing party and a shared party at an IM end, displaying a discussion interface corresponding to the IM group at a mail end, and sharing the target mail with the shared party, to enable information exchange between the sharing party and the shared party in the IM group and/or in the discussion interface based on the target mail; and
acquiring a message indicating update of a state of the IM group, and updating, in response to the message indicating update of the state of the IM group, a display state of the discussion interface, to synchronize the display state of the discussion interface with the state of the IM group.

* * * * *